United States Patent
Brown et al.

(10) Patent No.: US 7,447,763 B2
(45) Date of Patent: Nov. 4, 2008

(54) CREDENTIAL TRANSFER METHOD AND APPARATUS INCLUDING SENDER-DERIVED INDEX

(75) Inventors: Richard Brown, Frampton Cottrell (GB); Keith Alexander Harrison, Woodcroft Chepstow (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1412 days.

(21) Appl. No.: 09/955,222

(22) Filed: Sep. 19, 2001

(65) Prior Publication Data

US 2002/0112062 A1 Aug. 15, 2002

(30) Foreign Application Priority Data

Feb. 15, 2001 (GB) .................................. 0103735

(51) Int. Cl.
*G06F 11/30* (2006.01)
*G06F 13/14* (2006.01)

(52) U.S. Cl. .................. 709/224; 709/227; 370/254; 713/166

(58) Field of Classification Search .............. 709/206, 709/208, 225, 227, 220, 224, 228; 370/58, 370/59, 254; 713/189, 166, 184
See application file for complete search history.

(56) References Cited

U.S. PATENT DOCUMENTS

| 4,868,877 | A | | 9/1989 | Fischer |
| 5,499,372 | A | | 3/1996 | MacKenzie et al. |
| 5,689,565 | A | * | 11/1997 | Spies et al. ................ 713/189 |
| 5,754,938 | A | * | 5/1998 | Herz et al. ................ 725/116 |
| 5,754,939 | A | * | 5/1998 | Herz et al. ................ 455/3.04 |
| 5,784,566 | A | | 7/1998 | Viavant et al. |
| 5,790,677 | A | * | 8/1998 | Fox et al. ..................... 705/78 |
| 6,460,036 | B1 | * | 10/2002 | Herz ........................... 707/10 |
| 6,754,820 | B1 | * | 6/2004 | Scheidt et al. ............. 713/166 |

FOREIGN PATENT DOCUMENTS

WO WO 96/38799 12/1996

* cited by examiner

*Primary Examiner*—Khanh Dinh

(57) ABSTRACT

The present invention discloses a credential transfer method for use on a distributed electronic network the method comprising the steps of a sender communicating to a recipient a credential index comprising an index referring to at least one credential, the recipient selecting at least one of the credentials from the index of at least one credential provided by the sender, the recipient communicating to the sender an indication of the selected at least one credential and the sender providing to the recipient at least one credential corresponding to the selected at least one credential. A corresponding method of communication, system and digital credential index are also disclosed.

21 Claims, 3 Drawing Sheets

CREDENTIAL TRANSFER METHOD AND APPARATUS INCLUDING SENDER-DERIVED INDEX

The present invention relates to credential transfer methods, to methods of communication and to corresponding systems. The present invention further relates to digital credential indices.

In a distributed electronic network, such as the internet, when a user approaches a service provider for a service (which may, by way of example, be a financial transaction) the service provider may require in order to provide this service one or more credentials from the user. Generally a credential is a data structure provided to the user (sometimes referred to as the "bearer") for a purpose, with some acknowledged way to verify the user's right to use the credential. A credential normally will relate to an attribute such as the identity of the bearer. For instance, if the user is a customer seeking to purchase goods from a service provider, the service provider may require from the customer credit card details (credit card type, credit card number, name on credit card and expiry date), an address and perhaps other personal details such as, say, a passport number or phone number. In order to make a purchase from the service provider, the user must provide the service provider with the details requested.

Such a method and system has several disadvantages. First, it takes control away from the user/customer (the term "user" from now is intended to include reference to "customer"). That is, the user does not have control over the credentials to be provided.

Secondly, such a system and method is binary in the sense that the service provider provides authorisation (ie accepts the credentials) and allows the transaction to proceed or does not. There is no middle ground.

Preferred embodiments of the present invention aim to obviate or overcome disadvantages of the prior art such as those described above.

According to the present invention in a first aspect, there is provided a credential transfer method for use on a distributed electronic network, the method comprising the steps of a sender communicating to a recipient a credential index comprising an index referring to at least one credential, the recipient selecting at least one of the credentials from the index of at least one credential provided by the sender, the recipient communicating to the sender an indication of the selected at least one credential and the sender providing to the recipient at least one credential corresponding to the selected at least one credential.

According to the present invention in a second aspect, there is provided a method of communication for use on a distributed electronic network, which method comprises a credential transfer method according to the first aspect of the invention.

According to the present invention in a third aspect, there is provided a system configured and adapted to operate according to the first or second aspects of the invention.

According to the present invention in a fourth aspect, there is provided a digital credential index comprising an index to at least one credential.

The sender will generally, but not necessarily, be the bearer of the credentials. The sender may send data to the recipient directly or indirectly through a third party. The recipient may send data to the sender directly or indirectly through a third party. Reference to "direct" communication is via a distributed electronic network.

Suitably, the method comprises the additional step of determining whether the at least one credential is sufficient and communicating the result of the determination to the sender.

Suitably, the method comprises the additional step of determining a service level according to the at least one credential indexed in the credential index and the recipient communicating the service level to the sender.

Suitably, the sender communicates a plurality of credential indices to the recipient.

Suitably, the method comprises the additional step of determining a service level according to each of the plurality of credential indices communicated to the recipient by the sender and communicating the service level corresponding to at least one of the credential indices to the sender. Suitably, a service level is communicated to the sender for each credential index communicated to the recipient by the sender.

Suitably, the credential comprises a digital credential.

Suitably, the credential index comprises indices to a plurality of credentials.

Suitably, the method comprises the additional step of the sender selecting a credential index from a plurality of available credential indices.

The present invention will now be described, by way of example only, with reference to the drawings that follow; in which.

Figure 1:
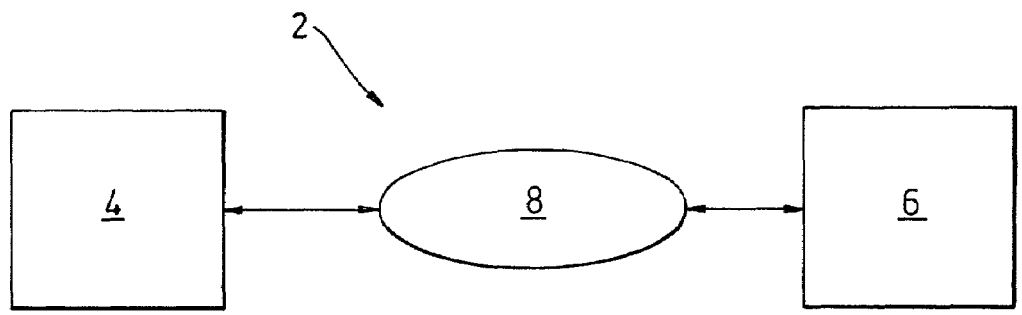
FIG. 1 is a schematic illustration of a distributed electronic network illustrating features of embodiments of the present invention.

Referring to FIG. 1, there is shown a distributed electronic network 2 comprising a user's terminal 4 (also used to designate the user generally) in electronic communication with a service provider 6 (the recipient) via the internet, indicated schematically at 8. In this embodiment the user 4 is the sender. It will be appreciated that embodiments of the present invention can be operated across other distributed electronic networks such as wide area networks or local area networks.

The user 4 is the bearer of a plurality of digital credentials obtained previously.

Figure 3:
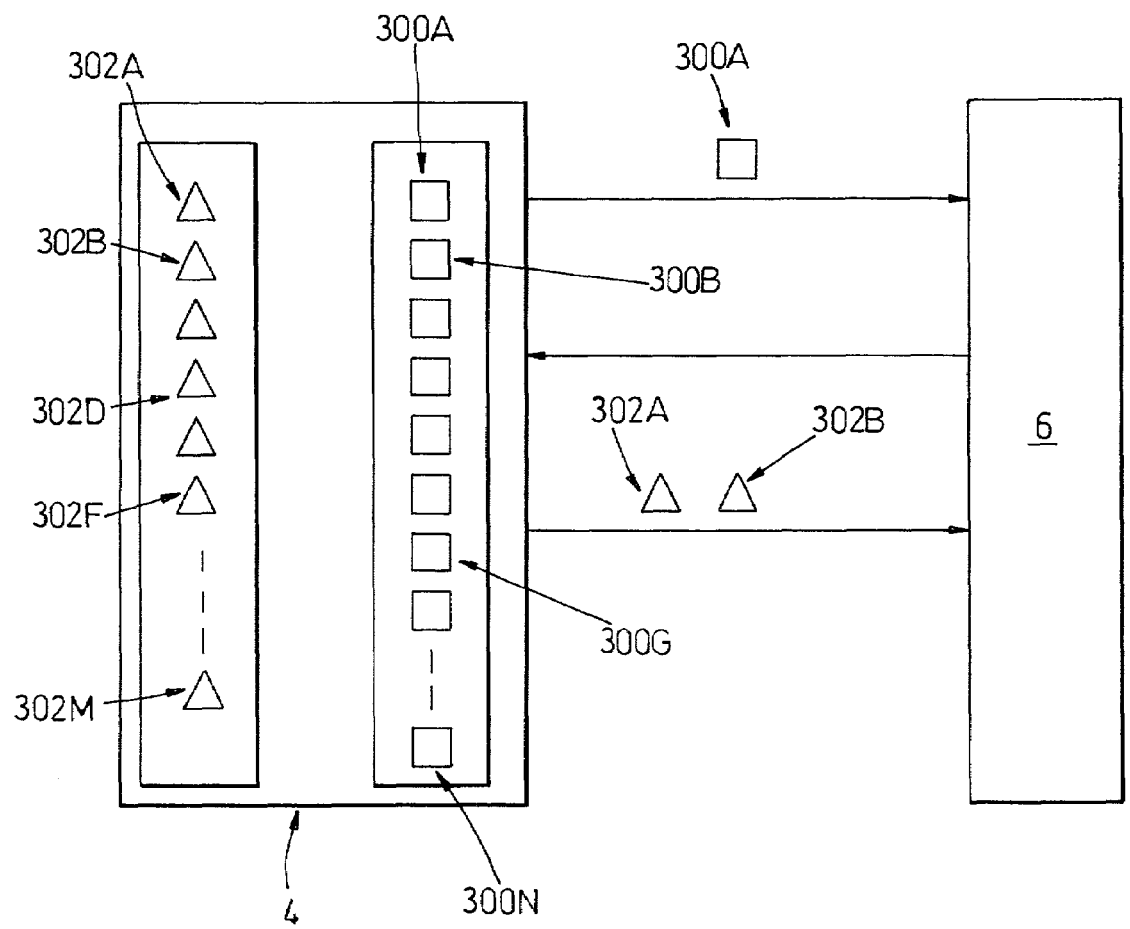
FIG. 3 is a schematic workflow diagram corresponding to the embodiment shown in FIG. 2.
Figure 2:
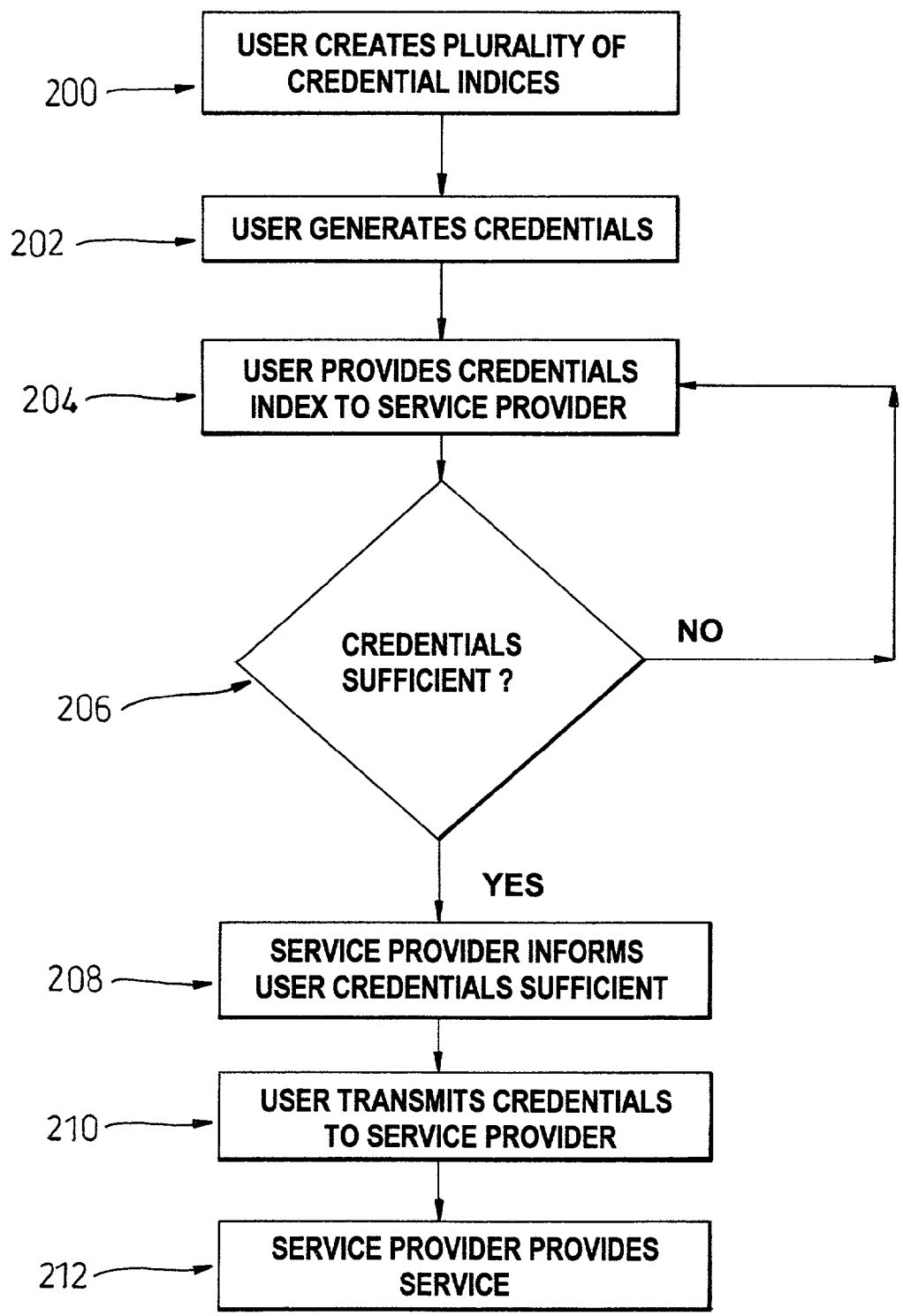
FIG. 2 is a functional flow diagram illustration of an embodiment of the present invention.

Referring to FIGS. 2 and 3 of the drawings that follow, a first embodiment of the present invention will now be described.

FIG. 2 is a step-by-step flow diagram of the first embodiment, while FIG. 3 is a corresponding overview of the workflow.

In step 200 (FIG. 2) the user 4 creates a plurality of different credential indices 300A-N. Embodiments of the present invention can operate with a single credential index 300, but in preferred embodiments the user generates a plurality of credential indices 300 ready for submission to service providers as desired. Each credential index 300 contains details of the credentials 302A-M the user 4 is willing to offer to the service provider 6. The credentials 302A-M are those the user 4 has available for selection to provide to a service provider. The number of credentials 302 need not (and generally will not) correspond to the number of credential indices 300. (For the sake of clarity, not all credential indices nor credentials are referenced in FIG. 3). So, for instance, the user 4 may include in a first credential index 300A reference to an address and a credit card details. In a second credential index 300B the user 4 may, for instance, include reference to a passport number and a telephone number. In a third credential index 300C the user 4 may, for instance, include reference to their employer's name and address and their bank details. The selection of to which credentials 302 are referenced in which credential index 300 is left to the user 4.

Credential indices 300 may contain simple reference to a credential 302 or be descriptive of the credential 302. For instance, the file of the credential may simply state that the credentials 302 are the user's name and address without giving any details of them. Alternatively or in addition the credential indices 300 may contain thumbnails of the relevant credentials. A thumbnail of a credential is a portion of it, a summary or a constrained description thereof. The key feature is that the credential itself is not disclosed. For instance a credential index 300 may include the first 12 digits of a credit card number or the first line of an address. A credential index may, alternatively, contain reference to, say, a credit card number (without disclosing the number itself) and a credit limit.

In an extreme example a credential index 300 may refer to a single credential 302. For the purpose of the embodiments described it is assumed that each credential index 300 references a plurality of credentials 302.

In step 202, the user 4 generates a package of credentials 302 corresponding to those indicated to be available in step 200. The credentials 302 may be generated separately or be combined in single credential document. This step can take place earlier or later in the procedure up to when the user 4 provides the credentials 302.

In step 204, the user 4, having decided to approach a service provider 6 for a service decides which credentials 302 he/she is willing to offer to the service provider 6 and provides a corresponding credential index to the service provider 6. For the present embodiment, the user 4 offers credentials 302A and 302B referred to in a credential index 300A. The credentials 302 the user 4 is willing to offer to the service provider 6 may vary, for instance, because of the user's confidence in the security of the site and/or the user's knowledge of the service provider involved in the transaction.

In step 206 the service provider 6, upon receipt of the credential index 300A from the user 4 reviews the credentials 302A and 302B offered decides (the decision making process may be automated) whether the type of credentials offered are sufficient to enable the service provider 6 to provide the service requested. If the service provider 6 is willing to accept the credentials 302A and 302B for the service it responds, in step 208 that the credentials 302A and 302B offered in the credential index 300A are acceptable and, in step 210, the user 4 transmits the credentials 302A and 302B corresponding to those referred to in the credential index 300A to the service provider 6. The service provider 6 then, in step 212 provides the corresponding service.

If, at step 206, the service provider 6 decides that the credentials 302A and 302B offered in the credential index 300A are not sufficient for the service provider 6 to provide the service it informs the user 4 to that effect. The user 4 then has the choice of either providing a new index of credentials (see step 204) or terminating the transaction.

Alternatively, the service provider 6 may just select one of the credentials 302A or 302B and indicate that this is sufficient for a transaction. The user 4 then transmits the relevant credential to the service provider 6.

Figure 4:
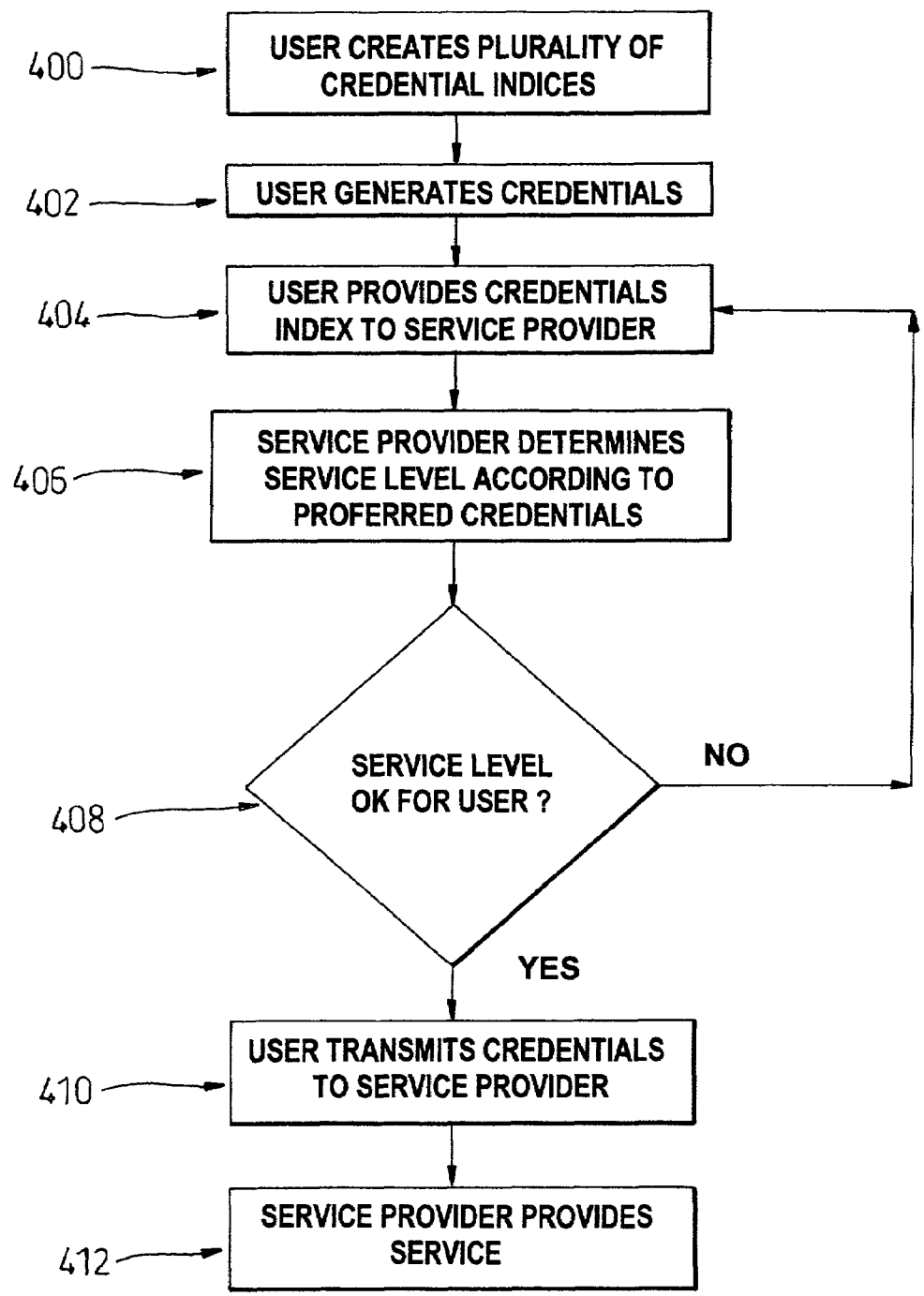
FIG. 4 is a functional flow diagram illustration of another embodiment of the present invention.

Referring to FIG. 4 of the drawings that follow, a further embodiment of the present invention is illustrated. In FIG. 4 the steps 400 to 404 correspond to those of steps 200 to 204 in relation to FIG. 2 and so will not be explained in detail here.

In step 406 the recipient 6 determines what service level is appropriate to the credentials 302 offered in the credential index 300 supplied by the user 4. So, for instance, in the case of the user 4 requesting a service for financial consideration if the user 4 communicates to the recipient 6 a credential index 300 referring to credit card details and an address, the service provider 6 determines how much credit it will extend to the user 4 saying it will offer services to a value up to £1,000 and communicates this to the user 4 in step 408. Steps 410 and 412 correspond to steps 210 and 212 in FIG. 2.

The determination by the service provider in step 406 may be to offer no service at all or some other service level, such as only offering certain types of service (say if products can only be supplied to those of a minimum age).

If the user 4 is not satisfied with the service level proposed by the service provider 6 at step 408, the user 4 can re-institute the procedure to seek another service level offer from the service provider 6.

In a modification of the embodiment of FIG. 4, in steps 404 the user 4 can provide to service provider 6 a plurality of credential indices 300 from which (as described in relation to FIG. 4) the service provider 6 determines for each credential index a corresponding service level the service provider is willing to offer. The service provider 6 therefore communicates to the user 4 a plurality of service level indicators linked (or otherwise cross-referenced) to the corresponding credential indices, respectively. The user 4 then determines which service level it wishes to select based on the user's assessment of the credentials required by the service provider 6 for the corresponding service. The user 4 then communicates the credential 302 to the service provider 6 (step 410).

Preferred embodiments of the present invention put into the control of the user the decision of which credential to provide to a service provider.

Further, an exchange of information takes place between user and service provider enabling the user to find a suitable service level according to the credentials the user is willing to provide to the service provider.

It is noted that although reference is made to a "service provider" in the preferred embodiments, the recipient of communication need not be the actual provider of the service.

Communications for the present invention may be encrypted.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extend to any novel one, or any novel combination, of the features disclosed in this specification (including any accompanying claims, abstract and drawings), or to any novel one, or any novel combination, of the steps of any method or process so disclosed.

The invention claimed is:

1. A credential transfer method used on a distributed electronic network, the method comprising the steps of a user causing a sender to communicate to a recipient a credential index comprising an index referring to at least one user-provided credential, the index including user-provided information (a) about the credential and (b) differing substantially from the credential such that the credential is not disclosed by the index, the recipient responding to the index communicated by the sender by (a) responding to an indication of a selected at least one credential communicated by the recipient by selecting at least one of the credentials from the index of at least one credential provided by the sender, and (b) communicating to the sender an indication of the selected at least one credential, and the sender providing to the recipient at least one credential corresponding to the selected at least one credential.

2. A credential transfer method according to claim 1, wherein the recipient is a service provider, the method further comprising the additional step of the recipient responding to the credential index by determining whether the at least one credential is sufficient for the recipient to provide a service to the sender and the recipient communicating the result of the determination to the sender.

3. A credential transfer method according to claim 1, in which the method comprises the additional step of the recipient responding to the credential index by determining a service level according to the at least one credential indexed in the credential index and the recipient communicating the determined service level to the sender.

4. A credential transfer method according to claim 1, in which the sender communicates a plurality of credential indices to the recipient, the number of credential indices exceeding the number of credentials.

5. A credential transfer method according to claim 4, in which the method comprises the additional step of the recipient responding to the credential index by (a) determining a service level according to each of the plurality of credential indices communicated to the recipient by the sender and (b) communicating the service level corresponding to at least one of the credential indices to the sender.

6. A credential transfer method according to claim 5, in which the recipient communicates a service level is communicated to the sender for each credential index communicated to the recipient by the sender.

7. A credential transfer method according to claim 1, in which the credential comprises a digital credential.

8. A credential transfer method according to claim 1, in which the credential index comprises indices to a plurality of credentials.

9. A credential transfer method according to claim 8, in which the method comprises the additional step of the sender selecting a credential index from a plurality of available credential indices.

10. A method of providing a service over a distributed electronic network, comprising:
   i. a user communicating to a service authorizer a credential index comprising an index referring to at least one user-provided credential, the index including user-provided information (a) about the credential and (b) differing substantially from the credential such that the credential is not disclosed by the index;
   ii. the service authorizer responding to the index communicated by the user by selecting at least one of the credentials from the index of at least one credential provided by the user;
   iii. the service authorizer responding to the credential selected from the index by communicating to the user an indication of the selected at least one credential;
   iv. the user responding to the indication of the selected at least one credential by providing to the service authorizer at least one credential corresponding to the selected at least one credential; and
   v. the service authorizer responding to the at least one credential corresponding to the selected at least one credential provided by the user by determining whether the at least one credential provided by the user is sufficient for a service to be authorized to be sent to the user, in response to the determination being positive, the service authorizer authorizing provision of the service to the user; in response to the determination being negative, the service authorizer taking some other action.

11. A computer-readable storage memory comprising computer instructions configured to direct a computer of a user to:
   i. communicate to the user by communicating to a recipient a credential index comprising an index referring to at least one user-provided credential, the index including user-provided information (a) about the credential and (b) differing substantially from the credential such that the credential is not disclosed by the index;
   ii. receive from the recipient an indication of at least one credential selected by the recipient from the index; and
   iii. provide to the recipient at least one credential corresponding to the selected at least one credential.

12. A computer-readable storage memory comprising computer instructions configured to direct a computer of a service authorizer to:
   i. receive from a sender a credential index comprising an index referring to at least one user-provided credential, the index including user-provided information (a) about the credential and (b) differing substantially-from the credential such that the credential is not disclosed by the index;
   ii. select from the index received from the sender at least one credential; and
   iii. enable an action on receipt of said at least one credential from the sender.

13. A processor for generating a digital credential index, the index comprising a data structure which provides for providing an index to at least one user-provided credential, the index including user-provided information (a) about the credential and (b) differing substantially from the credential such that the credential is not disclosed by the index, and providing at least one credential to a recipient in response to a selection of the at least one credential on the basis of information provided within the data structure.

14. A digital credential index processor according to claim 13, wherein the data structure provides indices to a plurality of credentials, the number of credential indices exceeding the number of credentials.

15. A computer for use by a user, the computer programmed to:
   i. communicate to the users, by communicating to a recipient a credential index comprising an index referring to at least one user-provided credential, the index including user-provided information (a) about the credential and (b) differing substantially-from the credential such that the credential is not disclosed by the index;
   ii. receive from the recipient an indication of at least one credential selected by the recipient from the index; and
   iii. provide to the recipient at least one credential corresponding to the selected at least one credential.

16. A computer for use by a service authorizer, the computer programmed to:
i receive from a sender a credential index comprising an index referring to at least one credential provided by the user, the index including information provided by the user (a) about the credential and (b) differing substantially from the credential such that the credential is not disclosed by the index;
ii. select from the index received from the sender at least one credential; and
iii. enable an action on receipt of said at least one credential from the sender.

17. The method of claim 2, wherein in response to the recipient deciding that the credentials offered in the credential index are not sufficient for the recipient to provide the sender with the service, the recipient informs the sender to that effect, and in response to the recipient informing the sender of the insufficiency, the sender supplies a new credential.

18. The method of claim 2, wherein in response to the recipient deciding that the credentials offered in the credential index are not sufficient for the recipient to provide the sender with the service, the recipient informs the sender to terminate the communication with the recipient 19. The method of claim 10, wherein in response to the determination being negative, the other action taken includes information the user to that effect, the user responding to the information that the determination is negative by (a) transmitting a new credential independent to the service authorizer, or (b) terminating the communication with the service authorizer.

20. The computer of claim 16, wherein the computer is programmed for determining whether the at least one credential provided by the user is sufficient for a service to be authorized to be sent to the user; in response to the determination being positive, the service authorizer authorizing and providing the service to the user; in response to the determination being negative, the computer being programmed for taking some other action.

21. The computer of claim 20, wherein, in response to the determination being negative, the other action taken includes informing the user to that effect, the user responding to the information that the determination is negative by (a) transmitting a new credential index to the service authorizer, the computer being programmed to receive the new credential index and perform the same steps in response to receipt of the new credential index as it performed in response to the earlier credential index.

* * * * *